(12) United States Patent
Nakawaki

(10) Patent No.: US 8,358,445 B2
(45) Date of Patent: Jan. 22, 2013

(54) IMAGE READING APPARATUS, CONTROL METHOD THEREFOR, AND STORAGE MEDIUM

(75) Inventor: Jun Nakawaki, Yokohama (JP)

(73) Assignee: Canon Kabushiki Kaisha (JP)

( * ) Notice: Subject to any disclaimer, the term of this patent is extended or adjusted under 35 U.S.C. 154(b) by 487 days.

(21) Appl. No.: 12/644,788

(22) Filed: Dec. 22, 2009

(65) Prior Publication Data

US 2010/0157382 A1 Jun. 24, 2010

(30) Foreign Application Priority Data

Dec. 24, 2008 (JP) ................................. 2008-327910

(51) Int. Cl.
*H04N 1/04* (2006.01)
(52) U.S. Cl. ......... 358/471; 358/1.9; 358/539; 358/1.16
(58) Field of Classification Search .................. 358/474, 358/1.9, 539, 1.16, 115, 471
See application file for complete search history.

(56) References Cited

U.S. PATENT DOCUMENTS

| | | | | |
|---|---|---|---|---|
| 5,432,891 A | * | 7/1995 | Onodera | 358/1.15 |
| 5,920,646 A | * | 7/1999 | Kamon | 382/173 |
| 6,088,124 A | * | 7/2000 | Tanaka | 358/1.9 |
| 7,468,803 B2 | * | 12/2008 | Aoyagi et al. | 358/1.15 |
| 7,738,143 B2 | * | 6/2010 | Ishimoto et al. | 358/3.28 |
| 7,990,557 B2 | * | 8/2011 | Tsunekawa | 358/1.15 |
| 8,031,378 B2 | * | 10/2011 | Suzuki | 358/3.28 |
| 8,086,090 B2 | * | 12/2011 | Yamauchi et al. | 386/248 |
| 8,112,706 B2 | * | 2/2012 | Uzawa | 715/243 |
| 2004/0165780 A1 | | 8/2004 | Maki et al. | |

FOREIGN PATENT DOCUMENTS

| | | |
|---|---|---|
| JP | 2003-060831 A | 2/2003 |
| JP | 2004-254101 A | 9/2004 |

OTHER PUBLICATIONS

Office Action Issued in corresponding Japanese Patent Application 2008-327910 dated Jul. 17, 2012.

* cited by examiner

*Primary Examiner* — Negussie Worku
(74) *Attorney, Agent, or Firm* — Rossi, Kimms & McDowell LLP

(57) ABSTRACT

An image reading apparatus that reads an image. Image data generated by a scanner reading an original is stored in a RAM. The size of the image data and the size of a region for storing the image data in the RAM are compared with each other. The image data is divided when the size of the image data is larger than the size of the region for storing the image data in the RAM. One of a plurality of pieces of image data divided from the image data is stored in the RAM, and the format of the image data stored in the RAM is converted. One image file including image data obtained by converting each piece of the plurality of pieces of image data is generated.

5 Claims, 9 Drawing Sheets

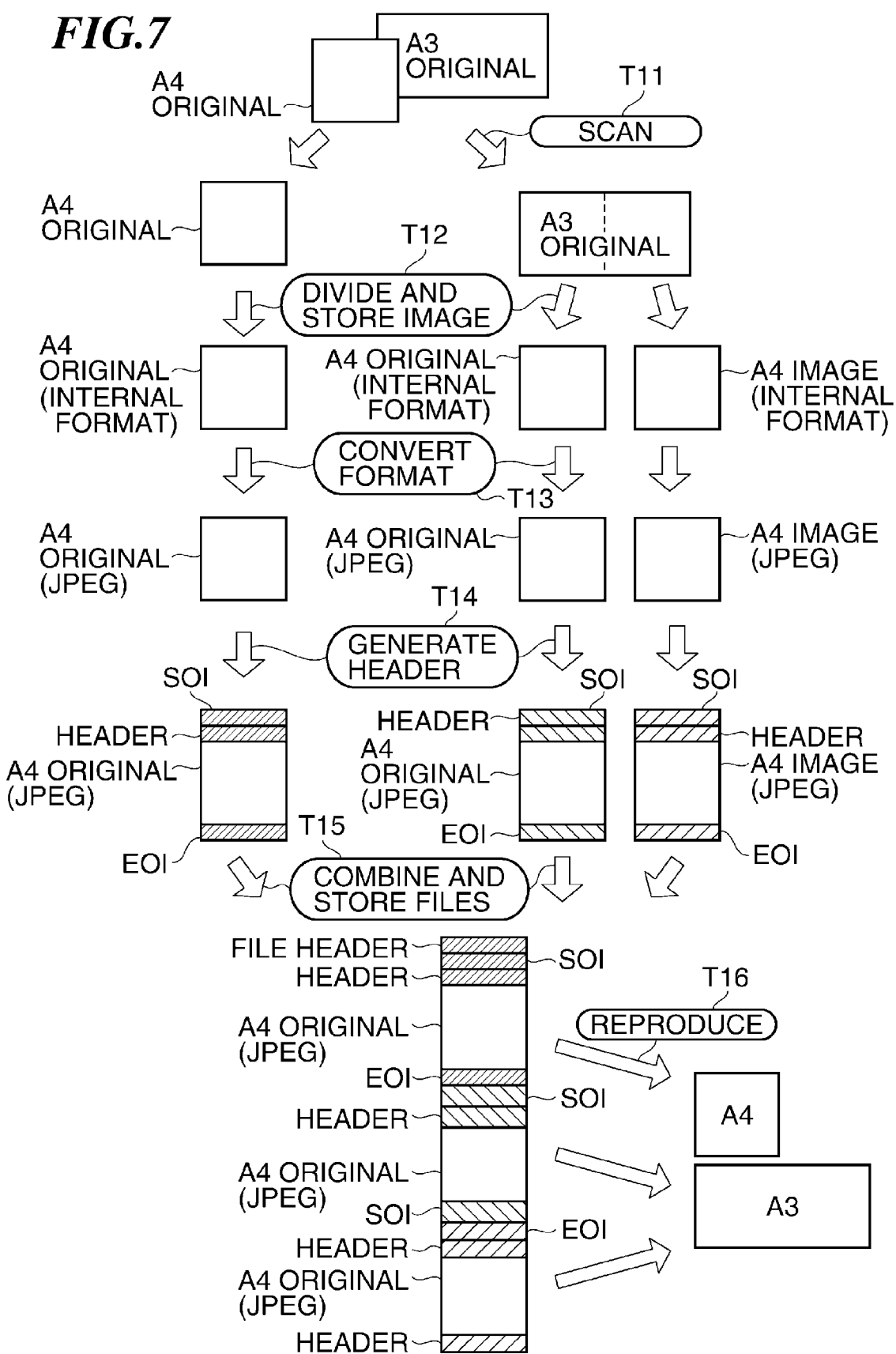

IMAGE READING APPARATUS, CONTROL METHOD THEREFOR, AND STORAGE MEDIUM

BACKGROUND OF THE INVENTION

1. Field of the Invention

The present invention relates to an image reading apparatus such as a scanner, a control method for the image reading apparatus, and a computer-readable storage medium storing a program for implementing the control method.

2. Description of the Related Art

Conventionally, image processing apparatuses generally output a format in which a plurality of still images are combined and recorded in the same file. For example, in Japanese Laid-Open Patent Publication (Kokai) No. 2004-254101, there has been proposed a method in which an output order is written in a header of a format, and at the time of reproduction, an order in which still images are reproduced is determined based on the header information of the format.

The above described prior art, however, has the following problem.

When a plurality of still images are to be combined in the same file and outputted, if the image size is large, there may be a case where, depending on a capacity of a memory incorporated in the image processing apparatus, the image data to be processed cannot be loaded into the memory.

To solve this problem, it can be considered that the capacity of the memory incorporated in the image processing apparatus is increased, but this would hinder reduction in costs of the image processing apparatus.

SUMMARY OF THE INVENTION

The present invention provides an image reading apparatus, a control method for the image reading apparatus, and a computer-readable storage medium storing a program for implementing the control method.

Accordingly, in a first aspect of the present invention, there is provided an image reading apparatus comprising an image reading unit, a work memory adapted to store image data generated by the image reading unit reading an original, a comparing unit adapted to compare a size of the image data with a size of a region for storing the image data in the work memory, a dividing unit adapted to divide the image data when the size of the image data is larger than the size of the region for storing the image data in the work memory, a converting unit adapted to store, in the work memory, one of a plurality of pieces of image data divided from the image data by the dividing unit, and convert a format of the image data stored in the work memory, and a image file generating unit adapted to generate one image file including image data obtained by the converting unit converting each piece of the plurality of pieces of image data.

Accordingly, in a second aspect of the present invention, there is provided a control method for an image reading apparatus that reads an image, comprising a comparing step of comparing a size of image data generated by an image reading unit reading an original with a size of a region for storing the image data in a work memory, a dividing step of dividing the image data when the size of the image data is larger than the size of the region for storing the image data in the work memory, a converting step of storing in the work memory one of a plurality of pieces of image data divided from the image data in the dividing step, and converting a format of the image data stored in the work memory, and a image file generating step of generating one image file including image data obtained in the converting step in which each piece of the plurality of pieces of image data is converted.

Accordingly, in a third aspect of the present invention, there is provided a computer-readable storage medium storing a program for implementing a control method for an image reading apparatus that reads an image, the control method comprising a comparing step of comparing a size of image data generated by an image reading unit reading an original with a size of a region for storing the image data in a work memory, a dividing step of dividing the image data when the size of the image data is larger than the size of the region for storing the image data in the work memory, a converting step of storing in the work memory one of a plurality of pieces of image data divided from the image data in the dividing step, and converting a format of the image data stored in the work memory, and a image file generating step of generating one image file including image data obtained in the converting step in which each piece of the plurality of pieces of image data is converted.

According to the present invention, even when the size of image data read by the image reading apparatus is large, image processing can be performed on the image data without increasing a capacity of the work memory, and therefore, costs can be reduced.

Further features of the present invention will become apparent from the following description of exemplary embodiments (with reference to the attached drawings).

BRIEF DESCRIPTION OF THE DRAWINGS

FIG. 7 is a data flowchart showing the dividing process in which image data on pages is divided according to the present embodiment.

DESCRIPTION OF THE EMBODIMENTS

Embodiments of the present invention will now be described in detail with reference to the drawings.

Figure 1:
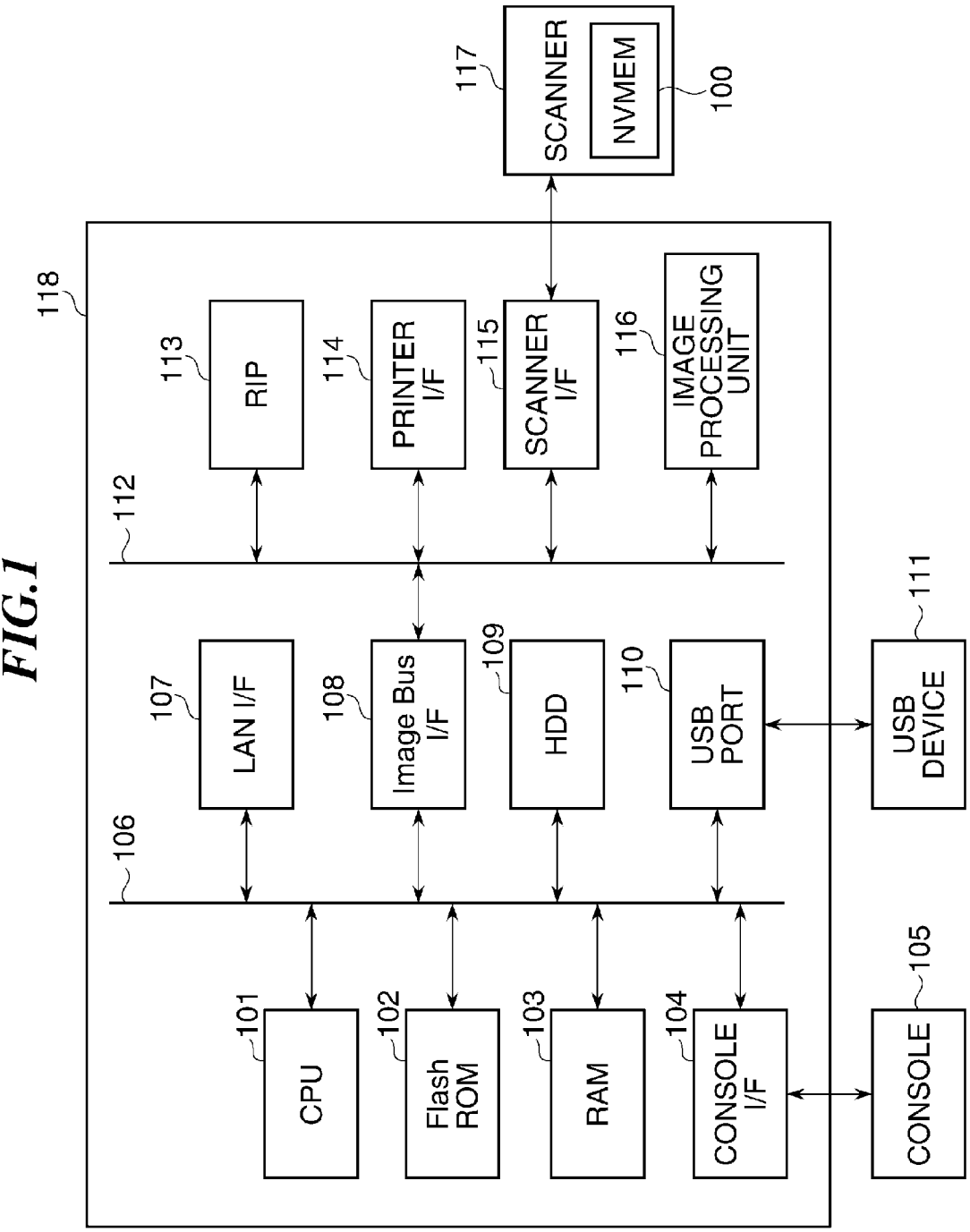
FIG. 1 is a block diagram schematically showing a hardware arrangement of an image reading apparatus.

FIG. 1 is a block diagram schematically showing a hardware arrangement of an image reading apparatus according to an embodiment of the present invention.

The image reading apparatus is comprised of a scanner 117, which is an exemplary original reading unit, and a controller unit 118. The controlled unit 118 connects to the scanner 117, thereby inputting image data and device information. A CPU 101 is a processor that controls an overall operation of the image reading apparatus. The CPU uses a RAM 103 as a work area when executing a program. Also, the RAM 103 is used as a temporary storage area when the CPU 101 processes image data. A flash ROM 102 is a rewritable non-volatile memory, in which various control programs for controlling the system are recorded. A console I/F 104 is an interface to a console 105, and outputs image data to be displayed on the console 105. Also, the console I/F 104 transmits, to the CPU 101, information inputted by a user on the console 105. A USB port 110 allows connection to a USB device 111.

The above devices are arranged on a system bus 106.

An image bus I/F 108 is a bus bridge that connects to each other the system bus 106 and an image bus 112 transferring image data at high speed, and converts data structure. The image bus 112 is comprised of a PCI bus or an IEEE 1394. Devices described below are arranged on the image bus 112.

A raster image processor RIP 113 expands vector data such as a PDL code into a bitmap image. A scanner I/F 115 connects the scanner 117 and the controller unit 118 to each other, and carries out conversion of image data. An image process unit 116 corrects, processes, and edits input image data, and carries out scanner correction, resolution conversion, etc. on scanner input image data. Also, the image process unit 116 has the functions of rotating image data, and carrying out compression and decompression of multi-valued image data using JPEG, and compression and decompression of binary image data using JBIG, MMR, MH, or the like, in addition to the above described functions. The scanner 117 scans in an original and converts the same into image data. For this, a laser system or the like is used, but any system may be used. A printer interface (printer I/F) 114 is connected to a printer engine, not shown.

The console 105 has an LCD display unit, and a touch-panel sheet is adhered on the LCD display unit. The console 105 also has operation keys. The console 105 displays a system operation screen, and when any displayed key is pressed, the console 105 provides the CPU 101 with positional information on the key.

A LAN interface 107 is a functional unit for connecting to a LAN, and is used to transmit an image file to a personal computer or a server and obtain information on other devices via the LAN.

The scanner 117 has an NVMEM 100, which is a non-volatile memory. Image data based on an original read by the scanner 117 is temporarily stored in the NVMEM 100 and then transferred to the RAM 103 via the scanner I/F 115.

The image reading apparatus is capable of storing, in an HDD 109, image data generated by the scanner 117 reading an original image, and printing the image data using a printer, not shown, via the printer I/F 114. Also, the image reading apparatus is capable of transmitting image data, which is generated by the scanner 117 reading an original image, to a computer device, not shown, to which the image reading apparatus is connected via the LAN I/F 107. Moreover, the image reading apparatus is capable of outputting image data, which is generated by the scanner 117 reading an original image, to the USB device 111 (for example, a USB memory) to which the image reading apparatus is connected via the USB port 110.

Figure 2:
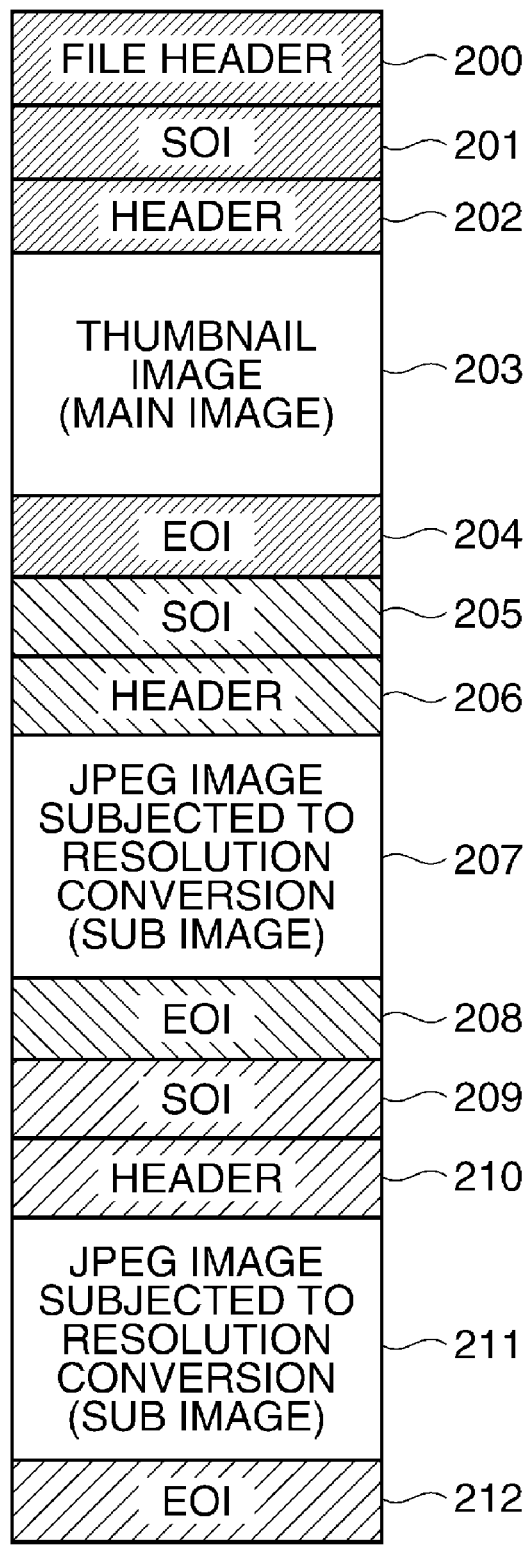
FIG. 2 is a schematic diagram showing an arrangement of a file format for recording a plurality of images in the same file.

FIG. 2 is a diagram schematically showing an arrangement of a format for recording still images on a plurality of pages in the same file.

In a file header 200 are written an address of a page header 202 for the first page (first-page header), a file size of a target file, and information indicating that the file is in a format in which a plurality of still images are recorded in the same file.

The first-page header 202 is header information written about first-page data 203. A second-page header 206 and second-page data 207, and a third-page header 210 and third-page data 211 have the same relationship. Information on a still image is written in each page data.

When a device that does not support this format refers to a file in this format, the device can refer to only the first-page header 202 and the first-page data 203.

Figure 3:
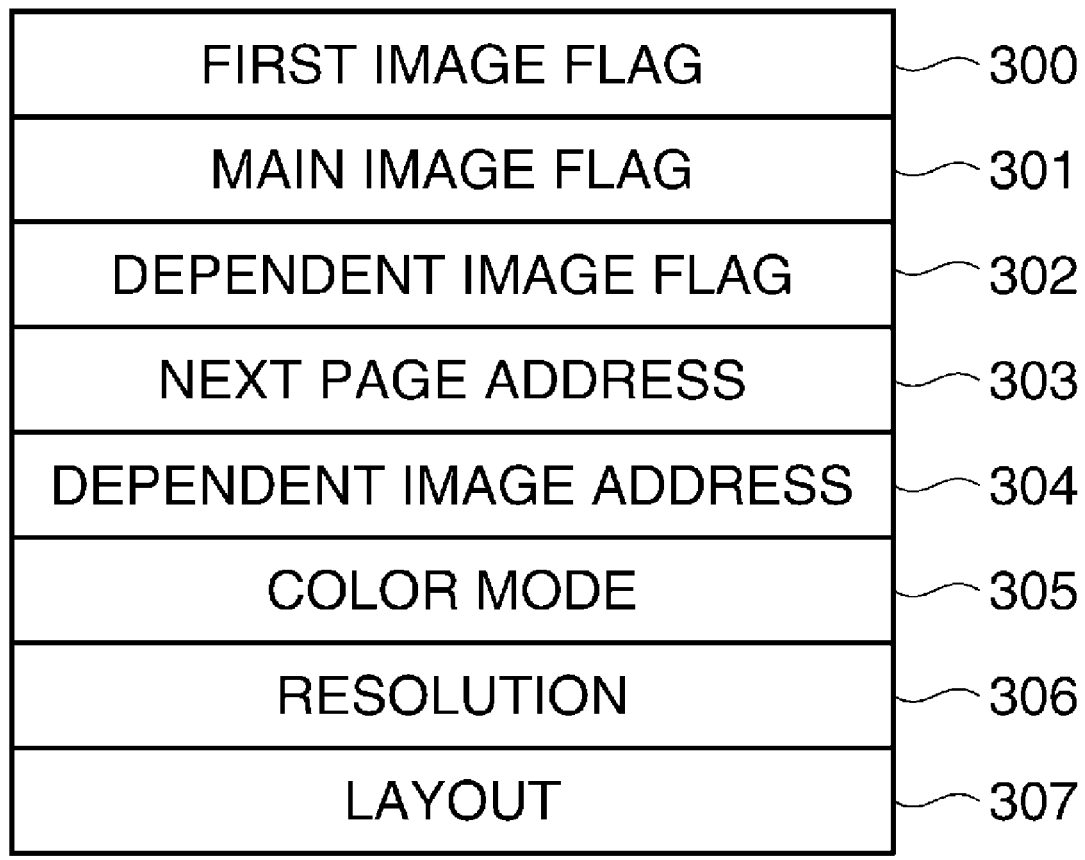
FIG. 3 is a schematic diagram showing an arrangement of a page header in the file format.

FIG. 3 is a diagram schematically showing an exemplary arrangement of the page headers 202, 206, and 210 shown in FIG. 2.

A first image flag 300 is a region indicative of whether or not this page is a first image. Here, the first image means a representative image among a plurality of images included in a file. In the present format, only one first image is always included in each file.

A main image flag 301 is a region indicative of whether or not there is a dependent image that is dependent on the present page, and a dependent image flag 302 is a region indicative of whether or not there is a main image on which the present page is dependent. In a next page address 303, a page header address of a page following the present page is stored.

When the present page is the last page, NULL is stored in the next page address 303 as a value indicating that the present page is the last page. A dependent image address 304 is an item that is provided only in a case where the present page is a main image, and in which the addresses of the respective page headers of dependent images dependent on the present page are stored.

A color mode 305 indicates whether the present page is a color image or a monochrome image, and a resolution 306 indicates the resolution of the present page. A layout 307 indicates layout information on image data of its own image and a dependent image, and indicates whether or not the layout information should be displayed next to the image being reproduced, and the layout thereof.

Figure 4A:
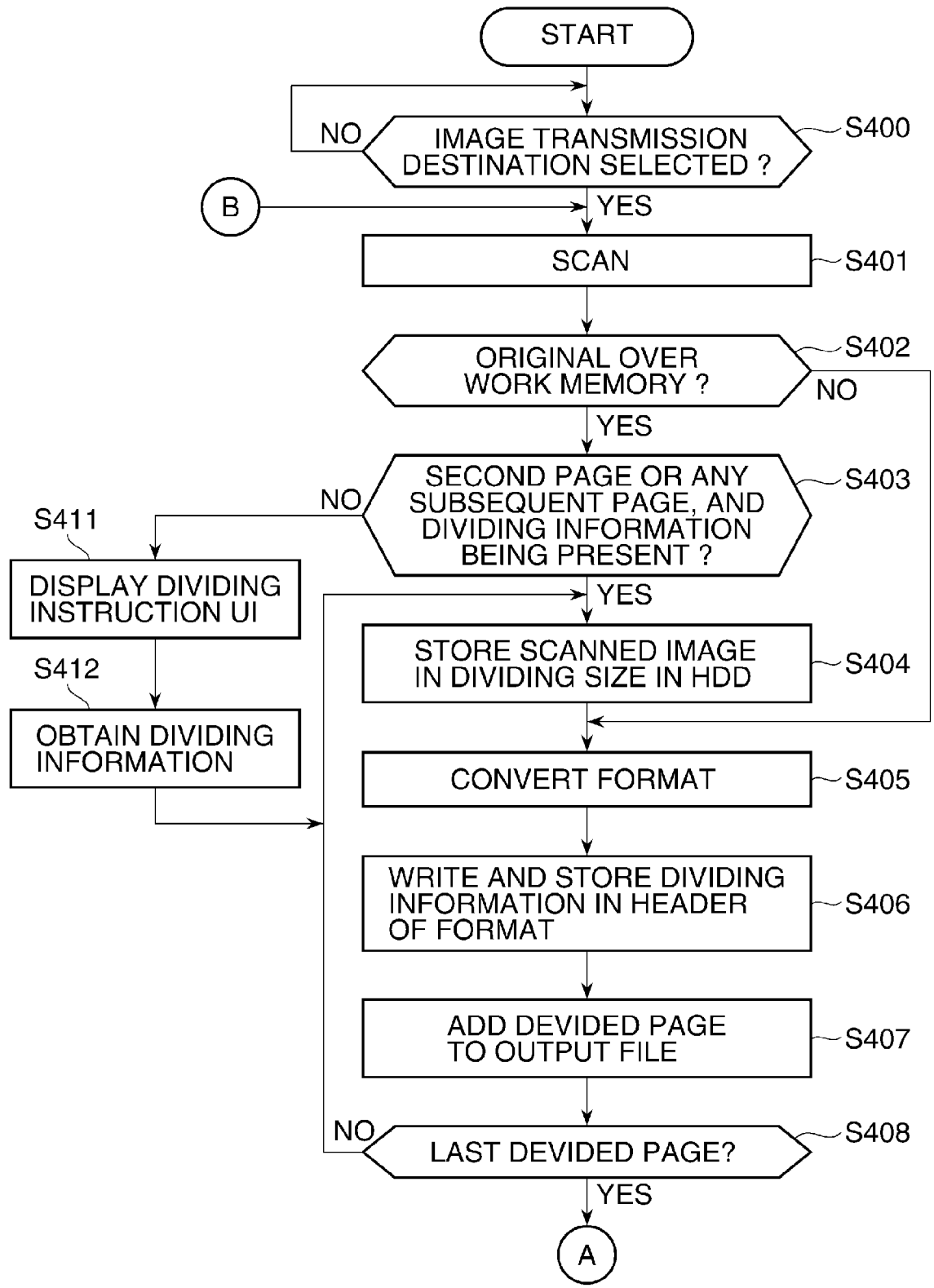
FIGS. 4A and 4B are flowcharts showing a dividing process in which image data on a page is divided according to a first embodiment.
Figure 4B:
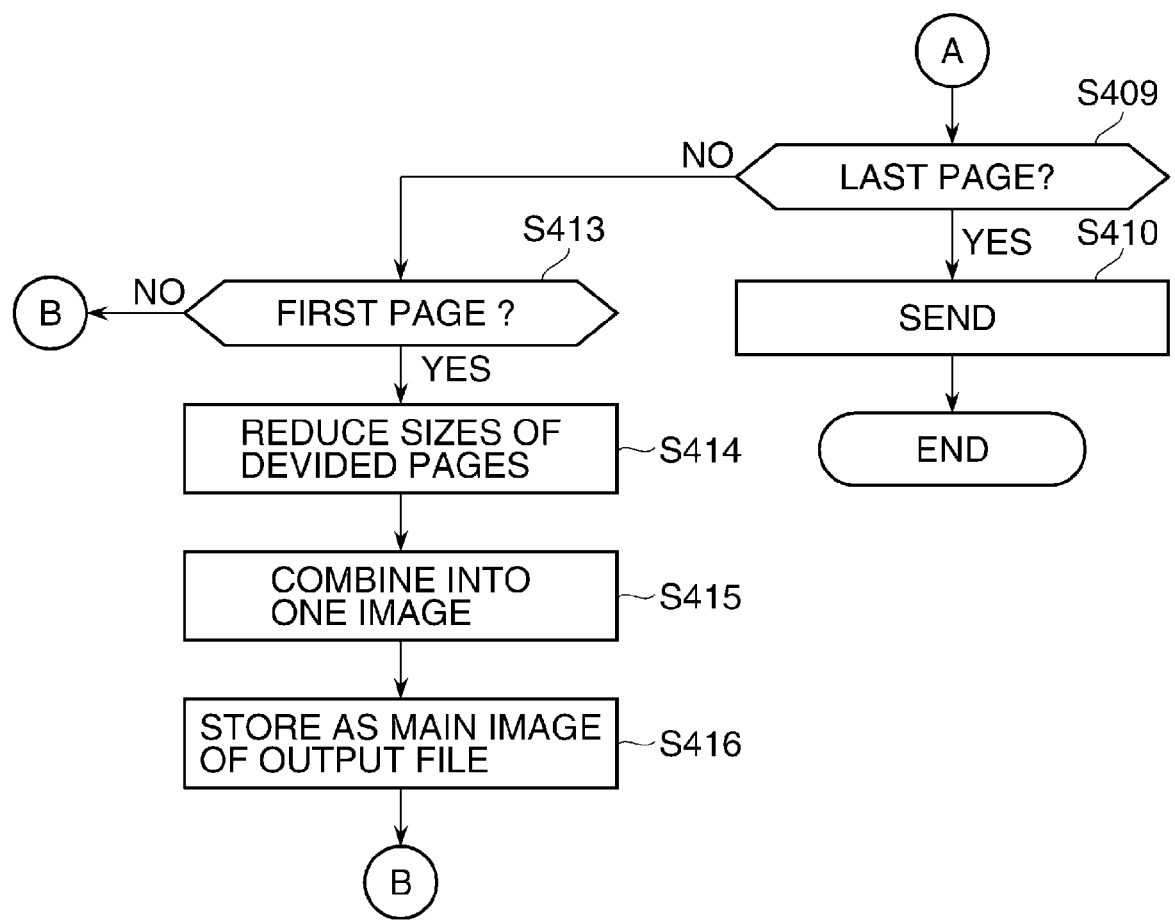
Figure 5:
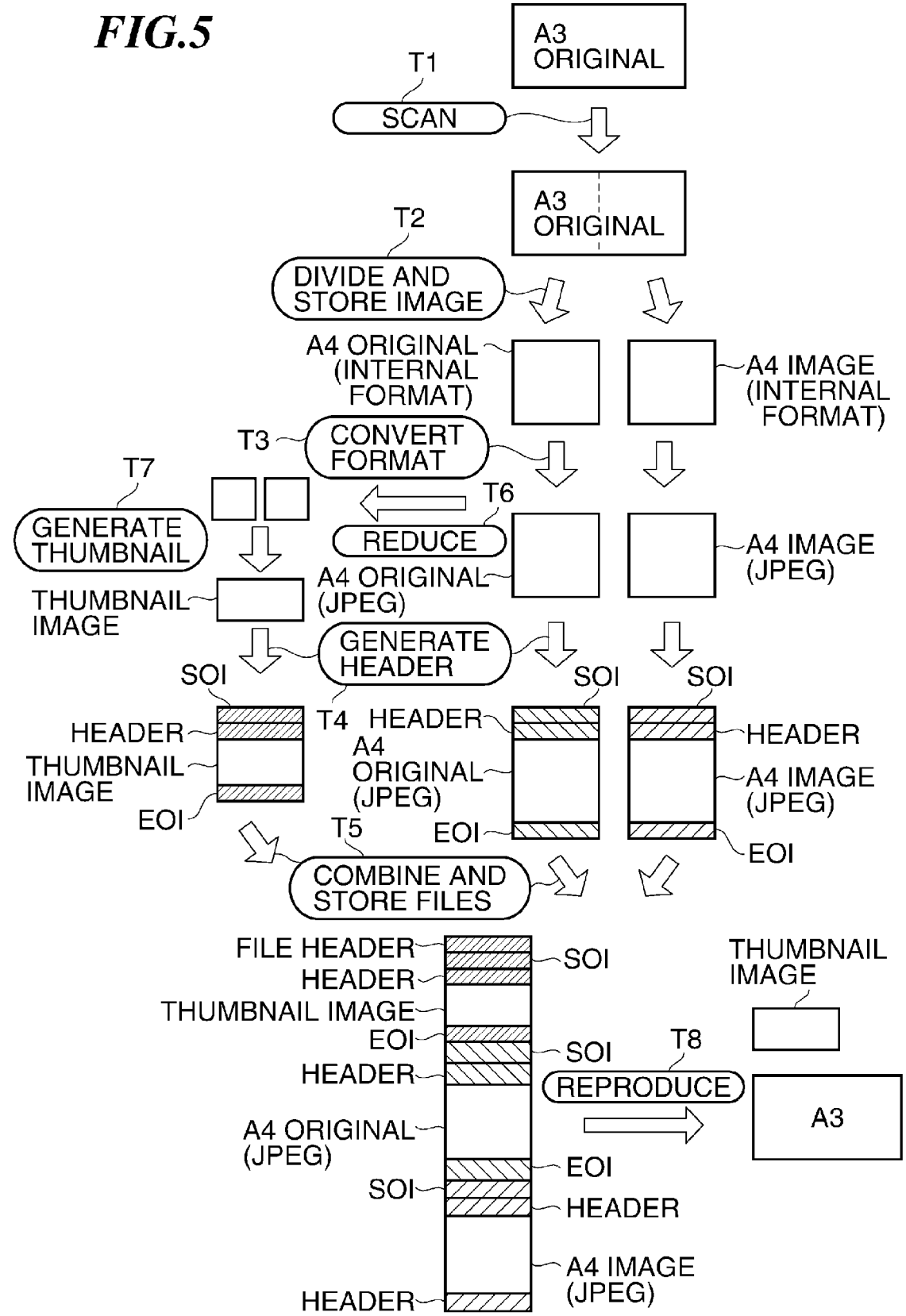
FIG. 5 is a data flowchart showing the dividing process in which image data on a page is divided according to the present embodiment.

Referring next to FIGS. 4 and 5, a description will be given of a dividing process in which image data on a page is divided according to a first embodiment.

FIGS. 4A and 4B are flowcharts showing the dividing process in which image data on a page is divided according to the present embodiment. FIG. 5 is a data flowchart in a case where the dividing process in FIGS. 4A and 48 is executed.

Because the RAM 103 is used for various processes executed by the CPU 101, a space that can be reserved in the RAM 103 (work memory) as a temporary storage area for image data dynamically changes. Thus, depending on a size of image data transmitted from the scanner 117 (varying according to the size of an original, resolution, the number of gradations, and so on), the whole image data of one page may not be stored in the RAM 103. A description will be given of the process for generating a file of image data based on an original image by dividing the image data even in a case where the whole image data of one page cannot be stored in the RAM 103.

First, in step S400, the CPU 101 determines whether or not a scanning instruction has been given by a user, and a storage location of an image file to be generated by scanning has been designated by the user. Specifically, the user places, for example, an A3-size original on the scanner 117, and gives a scanning instruction and designates the storage location of an image file to be generated by scanning using the console 105, and the CPU 101 accepts this instructing and designating operation. In this instance, the storage location of the image file may be a storage medium such as the HDD 109, a storage medium or a digital camera connected to the USB device 111, or a storage unit of a PC or an image reading apparatus connected to the LAN I/F 107.

Next, in step S401, the CPU 101 instructs the scanner 117 to read the original. The scanner 117 temporarily stores the read image data of one page in the NVMEM 100 in the scanner 117 (T1 in FIG. 5: "Scan"). It is assumed that the NVMEM 100 has such a storage space as to be able to store image data of one page generated by the scanner 117 scanning an original.

Then, in step S402, the CPU 101 obtains the size of the image data temporarily stored in the NVMEM 100, and compares the obtained image data size with a work memory size corresponding to the size of a region in the RAM 103 required to carry out image processing. Here, if the image data size is larger than the work memory size, the CPU 101 proceeds to step S403. If the image data size is smaller than the work memory size, the CPU 101 proceeds to step S405.

Next, in step S403, the CPU 101 determines whether or not the read original is the second page or any subsequent page, and dividing information has already been generated. The CPU 101 ascertains whether or not the read image data is the second page or any subsequent page, and there is dividing information designated in step S411, described later. When there is dividing information, the CPU 101 proceeds to step S404. If there is no dividing information, the CPU 101 proceeds to step S411. In this case, dividing information generated when the first page of originals is read is used for the second page and the subsequent pages as well.

Then, in the step S404, the CPU 101 obtains dividing information in step S412, described later, and instructs the scanner 117 to divide the image data in a dividing size based on the dividing information. In response to the instruction, the divided image data is transferred from the scanner 117, and the CPU 101 temporarily stores the transferred image data in the RAM 103 and then stores the same as uncompressed data in the HDD 109. At this time, coordinate positions of the separate images are generated as dividing information and stored in memory (T2 in FIG. 5: "Divide and Store Image").

Next, in the step S405, the CPU 101 loads the image data stored as the uncompressed data into the NVMEM 100, and converts the image data into a general format JPEG or the like that can be handled outside. At this time, because the image data was divided in the step S404, the amount of memory has only to be an amount corresponding to the size of each separate image, and hence the amount of memory required for one format conversion can be reduced (T3 in FIG. 5: "Convert Format").

Next, in step S406, the CPU 101 writes the dividing information obtained in the step S404 as layout information in the file headers of the divided page and stores the same in the HDD 109 (T4 in FIG. 5: "Generate Header"). Then, in step S407, the CPU 101 adds (gives) the files of the divided page stored in the HDD 109 in the step S406 to an output file (T4 in FIG. 5: "Combine and Store Files").

Next, in step S408, when the entire image scanned in the step S401 has been stored as files of the divided page, the CPU 101 proceeds to step S409. When the entire image scanned in the step S401 has not been stored as files of the divided page, the CPU 101 returns to the step S404, where the CPU 101 obtains from the scanner 117 the next separate image that has not been stored, and carries out the same process.

Next, in the step S409, when there is any original that has not been read into the scanner 117 in the step S401, the CPU 101 proceeds to step S413. This is a case where a plurality of originals are read using a document feeder or the like. When all the originals have been read, the CPU 101 proceeds to step S410. Then, in the step S410, the file generated in the present flow is transmitted to and stored in the designated file storage location in the step S400. This completes the generation of the image file.

On the other hand, when there is no dividing information in the step S403, the CPU 101 proceeds to step S411. In the step S411, the image scanned in the step S401 is displayed on the console 105, and the user designates a dividing method. For example, when the original was N-UP printed, the user designates how many pages were printed on one page. This designation is carried out by selecting regions in the displayed image. It should be noted that the dividing information is stored in the RAM 103 or the like, and when a plurality of originals are to be scanned, the same dividing information is applied to all the originals to be read in accordance with the present scanning instruction.

Alternatively, without asking the user for an instruction at this time point, dividing information may be automatically generated by storing in advance information indicative of a dividing method in the flash ROM 102 or the HDD 109 as configuration information on the image reading apparatus.

Next, in step S412, the CPU 101 obtains from the console 105 the dividing information designated by the user in the step S411. The dividing information is comprised of a plurality of rectangular information pieces. In this instance, when an output destination device is a system that carries out document management or a system that carries out image processing, the CPU 101 rounds the size of separate images to a general paper size. This can reduce the discontinuity of characters, and hence even if the divided image data is not reproduced based on the layout information, the image data can be subjected to processes such as OCR and image recognition.

Then, in step S413, the CPU 101 determines whether or not the processed page is the first page. When the processed page is the first page, the CPU 101 proceeds to step S414. When the processed page is not the first page, the CPU 101 returns to the step S401.

Next, in the step S414, the CPU 101 reduces the sizes of the respective images divided from the first page. The sizes to which the images are reduced are suitable sizes for thumbnail display (T6 in FIG. 5: "Reduce").

Then, in step S415, the CPU 101 combines the separate images reduced in size in the step S414 into one image (T7 in FIG. 5: "Generate Thumbnail"). Then, in step S416, the CPU 101 stores the thumbnail image produced in the step S414 as a main image of the output file. Thereafter, the CPU 101 returns to the step S401.

According to the present embodiment, by determining the size of the work memory for use in image processing, read image data can be divided and transmitted. At the time of reproduction of the divided image data, the separate images can be recombined by referring to layout information as the need arises (T8 in FIG. 5: "Reproduce"). Further, by dividing the image data into regular sizes, the image data can be processed even if the separate images are not recombined in processing after the transmission thereof. As a result, even when the size of read image data is large, it is possible to carry out image processing on the image data without increasing the capacity of the RAM 103, and this leads to reduced costs.

Moreover, if a display unit that displays a created file does not support the format of the present output file, the display unit can display the general outline of the file using a thumbnail image.

Moreover, a display unit that supports the format of the present output file can also display a thumbnail by displaying a main image without combining separate images when producing a thumbnail display.

Next, a description will be given of a second embodiment of the present invention.

The second embodiment differs from the above described first embodiment in that, when a plurality of originals of different sizes are scanned using a document feeder, it is possible to divide only originals required to be divided. The arrangement of an image reading apparatus according to the second embodiment is the same as the above described one according to the first embodiment.

Referring to FIGS. 6 and 7, a description will now be given of a dividing process in which image data on pages are divided according to the second embodiment.

Figure 6A:
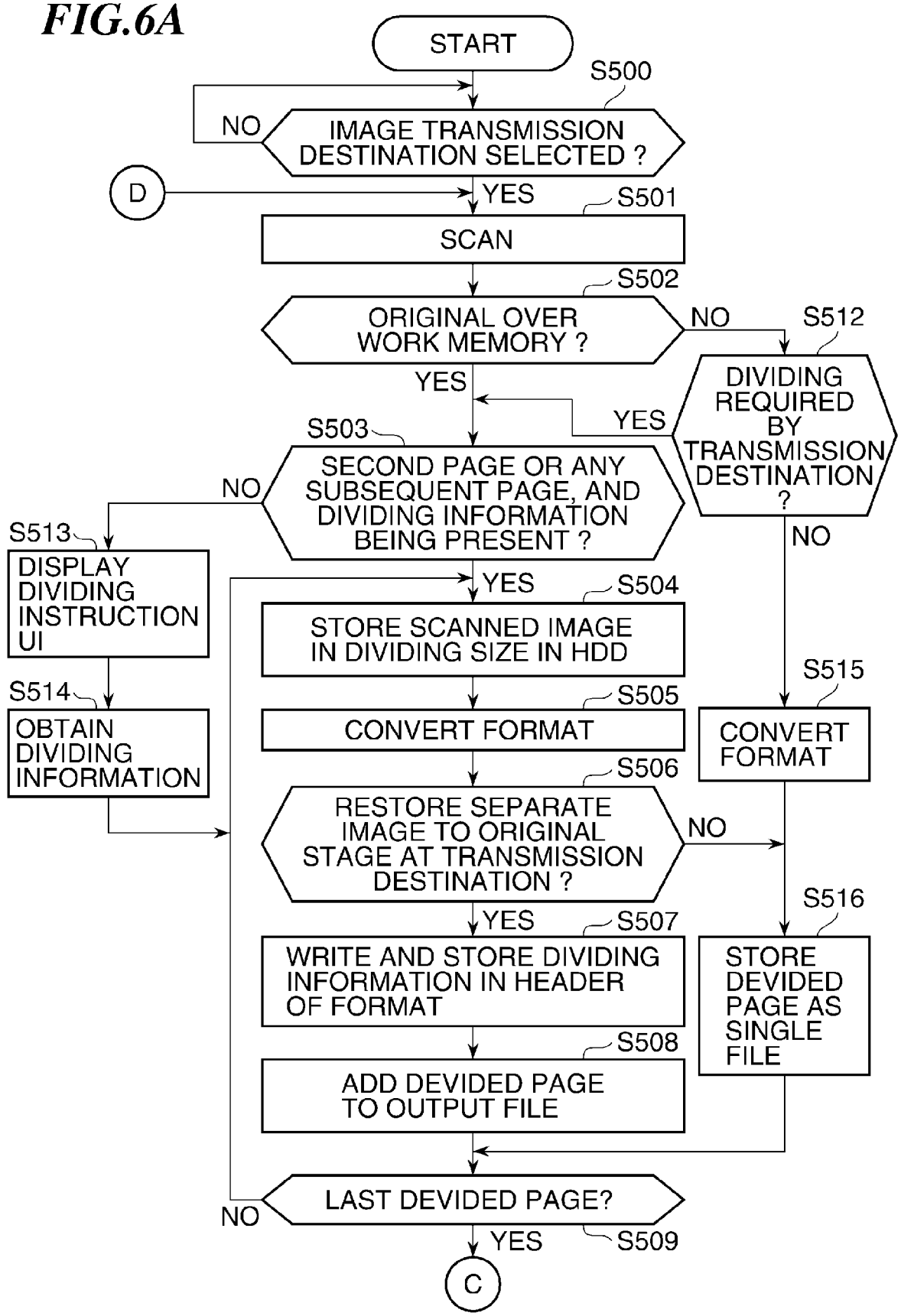
FIGS. 6A and 6B are flowcharts showing a dividing process in which image data on pages is divided according to a second embodiment.
Figure 6B:
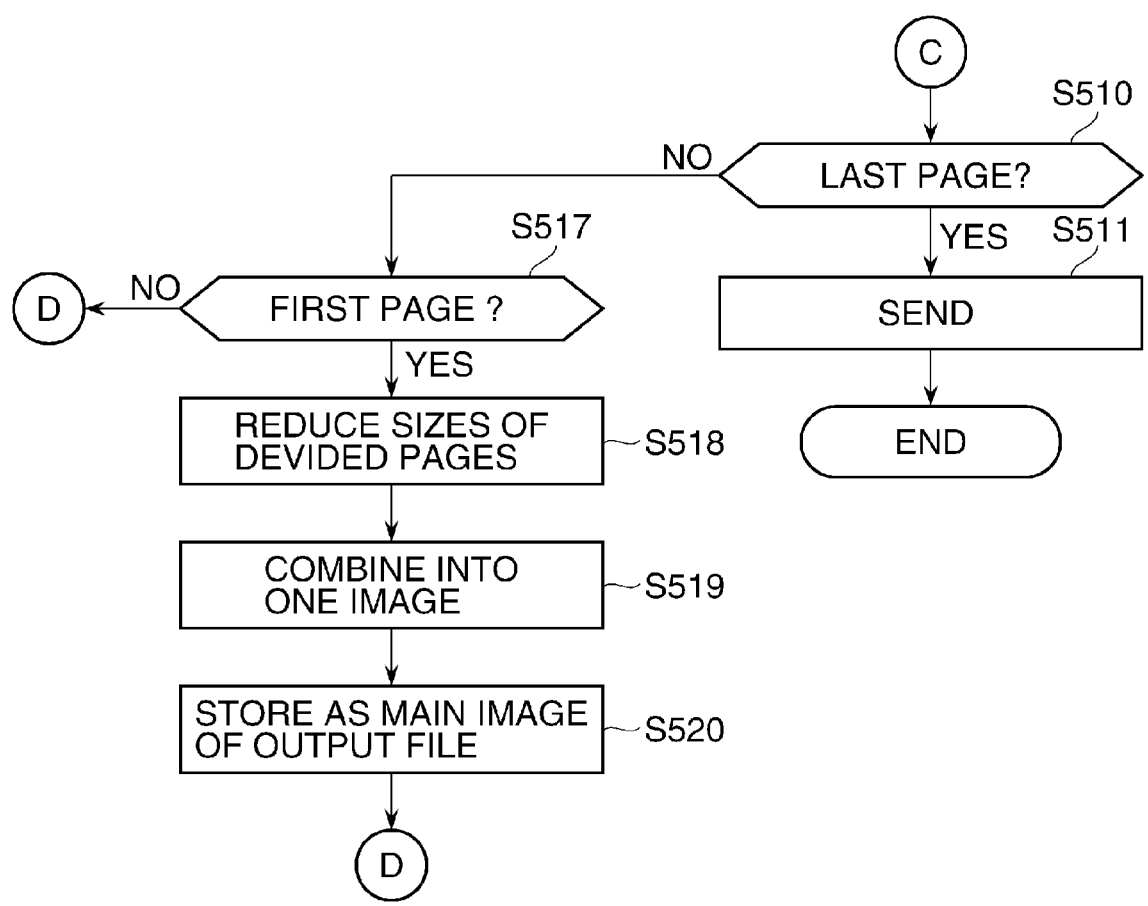

FIGS. 6A and 6B are flowcharts showing a dividing process in which image data on scanned pages is divided according to the present embodiment. FIG. 7 is a data flowchart in a case where the dividing process in FIGS. 6A and 6B is executed.

Processes in steps S500 to S505 are the same as the respective processes in the steps S400 to S405 in FIG. 4A in the first embodiment. However, it is assumed in the present embodiment, at the time of scanning in the step S501, a plurality of originals, for example, an A3 original and an A4 original are scanned using a document feeder as indicated by T11 in FIG. 7. Among these, only an image on the A3 original is subjected to dividing as indicated by T12 in FIG. 7. Thus, a format converting process in the step S505 is carried out on the three A4 images as indicated by T13 in FIG. 7.

In the next step S506, the CPU 101 obtains storage location information (or information on a device to which an image file is to be outputted) designated in the step S500. The CPU 101 determines whether or not layout information for restoring the divided page to its original state in the storage location or the output destination device is necessary. For example, when image data divided in A4 size is transmitted to a printer whose maximum paper size is A4, the image data cannot be restored to its original state even if there is pre-dividing layout information, and hence the layout information is not necessary. In this case, the CPU 101 proceeds to step S516. When it is necessary to restore the divided image data to its original state in the storage location or the output destination device, the CPU 101 proceeds to step S507, where headers are generated (T14 in FIG. 7). Whether or not layout information is necessary is determined based on processing instructions given by the user with respect to an original reading process being currently carried out.

Processes in the step S507 in which the separate image files are combined and stored (T15 in FIG. 7) and subsequent steps S508 to S511 are the same as the respective processes in the steps S406 to S410 of the first embodiment in FIGS. 4A and 4B.

In step S512, it is determined whether or not the output destination device requires divided image data. Specifically, even when it is determined in the step S502 that the size of the image data does not exceed the size of the work memory, there may be a case where the image data is required to be divided depending on the type of the output destination device. For example, there may be a case where a size of a work memory or a print paper size of an image forming apparatus as an output destination device is small. When divided image data is required by the output destination device, the CPU 101 proceeds to the step S503 so as to carry out the dividing process. When divided image data is not required by the output destination device, the CPU 101 proceeds to step S515 without dividing the image data.

Subsequent processes in steps S513 and S514 are the same as the respective processes in the steps S411 and 5412 of the first embodiment in FIG. 4A.

In the next step S515, the CPU 101 loads the image data stored as uncompressed data into the NVMEM 100, and converts the same into JPEG, which is a general format that can be handled outside. Then, in step S516, the CPU 101 stores the image data generated in the step S506 as a single image file.

Subsequent processes in steps S517 to S520 are the same as the respective processes in the steps S413 to S416 of the first embodiment in FIG. 45.

According to the second embodiment, even when originals of different sizes are scanned, it is possible to divide only originals required to be divided, and this can make the process more efficient.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-327910 filed Dec. 24, 2008, which is hereby incorporated by reference herein in its entirety.

What is claimed is:

1. An image reading apparatus comprising:
an image reading unit;
a work memory configured to store image data generated by said image reading unit reading an original;
a comparing unit configured to compare a size of the image data with a size of a region for storing the image data in said work memory;
a dividing unit configured to divide the image data when the size of the image data is larger than the size of the region for storing the image data in said work memory;
a converting unit configured to store, in said work memory, one of a plurality of pieces of image data divided from the image data by said dividing unit, and convert a format of the image data stored in said work memory;
a image file generating unit configured to generate one image file including image data obtained by said converting unit converting each piece of the plurality of pieces of image data; and
an adding unit configured to add header information including positional information to each of the plurality of pieces of the divided image data;
wherein said adding unit does not include the positional information in the header information of the image file when a device to which the image file generated by said image file generating unit is to be outputted does not require the positional information.

2. An image reading apparatus as claimed in claim 1, wherein said dividing unit divides the image data generated by said image reading unit in a dividing size designated from outside, or in a dividing size used when image data generated based on an original read by said image reading unit before was divided.

3. An image reading apparatus comprising:
an image reading unit;
a work memory configured to store image data generated by said image reading unit reading an original;

a comparing unit configured to compare a size of the image data with a size of a region for storing the image data in said work memory;

a dividing unit configured to divide the image data when the size of the image data is larger than the size of the region for storing the image data in said work memory;

a converting unit configured to store, in said work memory, one of a plurality of pieces of image data divided from the image data by said dividing unit, and convert a format of the image data stored in said work memory; and a image file generating unit configured to generate one image file including image data obtained by said converting unit converting each piece of the plurality of pieces of image data;

wherein said image file generating unit generates one image file including image data of a plurality of pages, and each of a plurality of pieces of image data divided by said dividing unit constitutes one page of the image file generated by said image file generating unit.

4. A control method for an image reading apparatus that reads an image, comprising:

a comparing step of comparing a size of image data generated by an image reading unit reading an original with a size of a region for storing the image data in a work memory;

a dividing step of dividing the image data when the size of the image data is larger than the size of the region for storing the image data in the work memory;

a converting step of storing in the work memory one of a plurality of pieces of image data divided from the image data in said dividing step, and converting a format of the image data stored in the work memory;

a image file generating step of generating one image file including image data obtained in said converting step in which each piece of the plurality of pieces of image data is converted; and an adding step of adding header information including positional information to each of the plurality of pieces of the divided image data;

wherein said adding step does not include the positional information in the header information of the image file when a device to which the image file generated by said image file generating step is to be outputted does not require the positional information.

5. A non-transitory computer-readable storage medium storing a program for implementing a control method for an image reading apparatus that reads an image, the control method comprising:

a comparing step of comparing a size of image data generated by an image reading unit reading an original with a size of a region for storing the image data in a work memory;

a dividing step of dividing the image data when the size of the image data is larger than the size of the region for storing the image data in the work memory;

a converting step of storing in the work memory one of a plurality of pieces of image data divided from the image data in said dividing step, and converting a format of the image data stored in the work memory;

a image file generating step of generating one image file including image data obtained in said converting step in which each piece of the plurality of pieces of image data is converted; and an adding step of adding header information including positional information to each of the plurality of pieces of the divided image data;

wherein said adding step does not include the positional information in the header information of the image file when a device to which the image file generated by said image file generating step is to be outputted does not require the positional information.

* * * * *